United States Patent
Ellens et al.

(10) Patent No.: US 6,695,982 B2
(45) Date of Patent: Feb. 24, 2004

(54) HIGHLY EFFICIENT FLOURESCENT MATERIALS

(75) Inventors: Andries Ellens, Den Haag (NL); Manfred Kobusch, Munich (DE); Wolfgang Rossner, Holzkirchen (DE)

(73) Assignees: Patent-Treuhand-Gesellschaft für elektrische Glüjlampen mbH, München (DE); Osram Opto Semiconductors GmbH & Co. oHG, Regensburg (DE)

(*) Notice: Subject to any disclaimer, the term of this patent is extended or adjusted under 35 U.S.C. 154(b) by 50 days.

(21) Appl. No.: 10/048,963

(22) PCT Filed: Jun. 7, 2001

(86) PCT No.: PCT/DE01/02130

§ 371 (c)(1),
(2), (4) Date: Feb. 4, 2002

(87) PCT Pub. No.: WO01/95400

PCT Pub. Date: Dec. 13, 2001

(65) Prior Publication Data

US 2002/0149001 A1 Oct. 17, 2002

(30) Foreign Application Priority Data

Jun. 9, 2000 (DE) .......................... 100 28 266

(51) Int. Cl.[7] .......................... C09K 11/56; C09K 11/64; C09K 11/62; C09K 11/55
(52) U.S. Cl. ................................. 252/301.45
(58) Field of Search ..................... 252/301.45

(56) References Cited

U.S. PATENT DOCUMENTS

| | | |
|---|---|---|
| 3,639,254 A | 2/1972 | Peters |
| 5,747,929 A | 5/1998 | Kato et al. |
| 5,834,053 A | 11/1998 | Dye et al. |
| 2002/0190241 A1 * | 12/2002 | Le Mercier et al. .. 252/30.14 S |

FOREIGN PATENT DOCUMENTS

| | | | |
|---|---|---|---|
| EP | 12365 | * | 6/1980 |
| EP | 0 740 490 A | | 10/1996 |
| EP | 0 816 471 | | 1/1998 |
| JP | 53-61964 | * | 6/1978 |
| JP | 53-76987 | * | 7/1978 |
| JP | 53-91658 | * | 8/1978 |
| JP | 57-40836 | * | 3/1982 |
| WO | WO 98/18721 | | 5/1998 |

OTHER PUBLICATIONS

Database WPI Section CH, Week 199016 Derwent Publication Ltd., London, GB; C1. L03, An 1990–120814 and JP 02 072592 A Mar. 12, 1990.

* cited by examiner

Primary Examiner—C. Melissa Koslow
(74) Attorney, Agent, or Firm—Frishauf, Holtz, Goodman & Chick, P.C.

(57) ABSTRACT

A high efficiency phosphor from the class of the thiometallates, preferably of the thiogallates. The thiometallate being made so as to correspond to the formula $(AS) \cdot w(B_2S_3)$, where A is at least one divalent cation selected from Mg, Ca, Sr, and where B is at least one trivalent cation selected from Al, Ga, Y. The factor w may lie either in the range $0.8 \leq w \leq 0.98$ or in the range $1.02 \leq w \leq 1.2$.

4 Claims, 1 Drawing Sheet

HIGHLY EFFICIENT FLOURESCENT MATERIALS

This application is a U.S. National Phase Application under 35 USC 371 of International Application PCT/DE01/02130 (not published in English) filed Jun. 7, 2001.

FIELD OF THE INVENTION

The invention is based on a phosphor from the class of thiometallates, being derived from the general formula $AB_2S_4:D^{2+}$, where A is at least one divalent cation selected from the group consisting of Mg, Ca, Sr, and where B is at least one trivalent cation selected from the group consisting of Al, Ga, Y, and where the dopant/activator D is europium and/or cerium. The proportion made up by divalent cation A is reduced by the proportion t of the activator D which is added. These are in particular thiogallates, which emit light in the green spectral region. The composition of the phosphor is made up in such a way that the molar ratio of divalent ions A to trivalent ions B does not precisely correspond to the general empirical formula $AB_2S_4$, i.e. does not correspond to the ratio A:B=1:2.

BACKGROUND OF THE INVENTION

U.S. Pat. No. 3,639,254 and U.S. Pat. No. 5,834,053 have already disclosed thiogallates, the emission spectra of which lie in the blue or green spectral region. These phosphors follow the formula $AGa_2S_4$, where A represents at least one element from the group of the alkaline-earth metals, in particular Ca, Ba, Sr or Zn. Activators are europium, lead or cerium. However, for applications which require a high light efficiency (e.g. illumination engineering), the emission efficiencies of said phosphors are too low. This emission efficiency is expressed by what is known as the quantum efficiency QE (ratio of number of quanta emitted to the number of excitation quanta absorbed). Typical quantum efficiencies for said phosphors are between 60% and 70%.

WO 98/18721 has disclosed an electroluminescent phosphor selected from the group of the thiometallates, with Sr or another alkaline-earth metal as divalent cation, Ga, Al or In acting as the trivalent cation. In particular, this document describes a production process which retains a certain amount of residual oxygen.

SUMMARY OF THE INVENTION

It is an object of the present invention to provide a thiometallate phosphor which has a quantum efficiency which is as high as possible for a predetermined emission wavelength.

According to the invention, the composition of the phosphor is selected in such a way that the ratio of divalent ions A to trivalent ions B, working on the basis of the general empirical formula $AB_2S_4$, differs from the ratio A:B=1:2. The concept of the invention can also be expressed in a different way if the thiometallates of the original empirical formula $AB_2S_4$ are written as a product of the components AS and B2S3 in the form $AS \cdot B_2S_3$. The ratio of the component AS to the component $B_2S_3$ is described below by the factor w=$B_2S_3$/AS. The overall result is that the thiometallate is represented as $(AS) \cdot w(B_2S_3)$. It has been found that phosphors having the composition $(AS) \cdot w(B_2S_3)$ provide higher quantum efficiencies than phosphors with the composition w=1 both in the range $0.8 \leq w \leq 0.98$ and in the range $1.02 \leq w \leq 1.2$.

The combination of various cations of type A and B makes it possible to achieve different emission wavelengths and color loci and to adapt them to the particular application. For an efficient ("bright") phosphor, there must additionally be a low reflection in the excitation range and a high quantum efficiency. Mg, Ca, Sr, individually or primarily in combination, are suitable as cation A. It has proven particularly appropriate to use all three metals together. Europium or cerium are suitable activators which partially replace A. It is preferable for Ga or Al or Y to be used as cation B. The gallium may in this case in particular be partially replaced (up to 10 mol%) by aluminum. The dopant D (D=Eu and/or Ce) is counted completely as part of the sub-component AS, i.e. represented in full the formula is $A_{1-t}D_tS$.

Phosphors having the composition $(AS) \cdot w(B_2S_3)$, where $A=Mg_aCa_bSr_cEu_t$, with a+b+c+t=1, where the following ranges apply: $0.4 \leq a \leq 0.7$; $0.1 \leq b \leq 0.4$; $0 \leq c \leq 0.4$; $0.01 \leq t \leq 0.1$ and $B=(Ga_xAl_yY_z)_2$ with x+y+z=1 and $0.9 \leq x \leq 1$ and $0 \leq y \leq 0.1$ and $0 \leq z \leq 0.1$ and $0.8 \leq w \leq 0.98$ or $1.02 \leq w \leq 1.25$, preferably $w \leq 1.2$, have particularly high quantum efficiencies. c is preferably $\leq 0.01$.

A production process employs the following steps:
a) production of a suspension of nitrates corresponding to the desired composition;
c) drying of this suspension to a residual moisture content of <1% by weight at $T \leq 300°$ C., in order to produce a finely dispersed nitrate mixture;
c) milling of the nitrate mixture in a mortar mill at room temperature for 10 min to 60 min, preferably 15 to 25 min;
d) pyrolysis of the milled nitrate mix at 500–700° C., preferably at 600° C., in an Ar or $N_2$ atmosphere in order to produce a finely dispersed metal oxide mixture of the desired composition;
e) initial reaction of the metal oxide mixture at 800–1000° C., preferably 900–950° C., in flowing $H_2S$ or $CS_2$ atmosphere or combinations thereof for 1–6 hours, preferably 4 hours;
f) milling the reaction product as in step c;
g) second reaction at 800–1000° C., preferably 900–950° C., in a flowing $H_2S$ or $CS_2$ atmosphere or combinations thereof for 1–6 h, preferably for 2 h.

In steps e) and g), the quantitative flow rate is preferably 50–500 ml/min, ideally 120 ml/min, and the gas atmosphere preferably comprises $H_2S$ or $CS_2$ and Ar or $N_2$ as carrier gas, with 10–50% of $H_2S$ or $CS_2$ or mixtures thereof, preferably 30% of $H_2S$ or $CS_2$ or mixtures thereof.

Gradual heating up to the reaction temperature is carried out in steps e) and g), preferably at a rate of 0.5–20 K/min, ideally 10 K/min.

Moreover, in steps e) and g) gradual cooling is carried out after the reaction, preferably at a rate of 0.5–20 K/min, ideally 10 K/min.

The phosphors according to the invention are particularly suitable for use in UV-emitting or blue-emitting LEDs for color conversion. They can be used individually or in combination with other phosphors, in particular in combination with other phosphors according to the invention. Plasma displays are another possible application. For this purpose too, the phosphors may be used individually or in combination with other phosphors, in particular in combination with other phosphors according to the invention, in order to convert the short-wave plasma discharge radiation into visible light.

BRIEF DESCRIPTION OF THE DRAWINGS

The invention is to be explained in more detail below with reference to an exemplary embodiment. In the figures.

DETAILED DESCRIPTION OF THE PREFERRED EMBODIMENT

Figure 1:
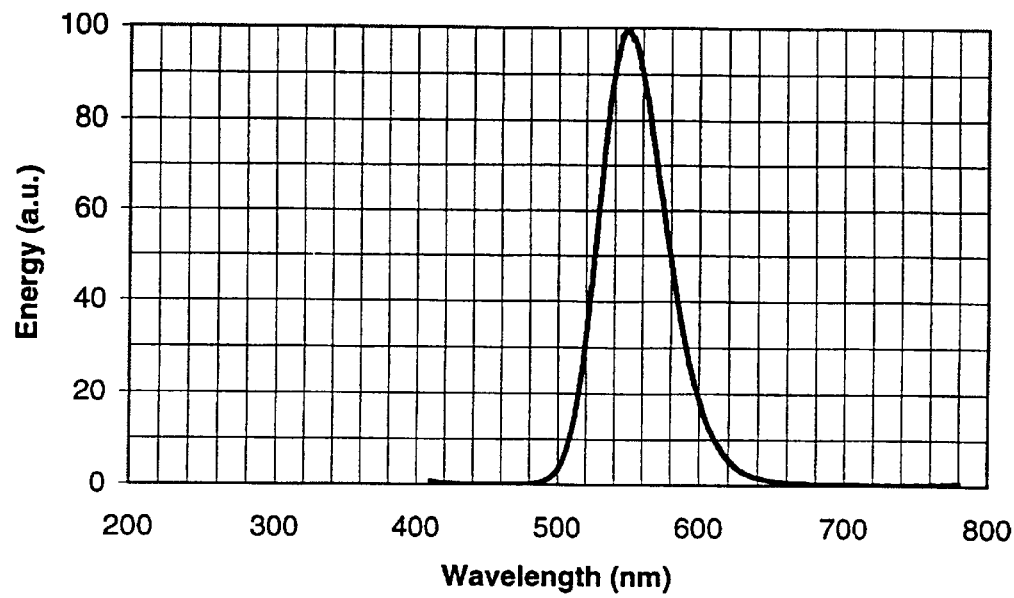
FIG. 1 shows the emission spectrum of the phosphor $(Sr_{0.0105}Ca_{0.210}Mg_{0.063}Eu_{0.055})S \cdot 1.1Ga_2S_3$, produced using the process described in the exemplary embodiment.
Figure 2:
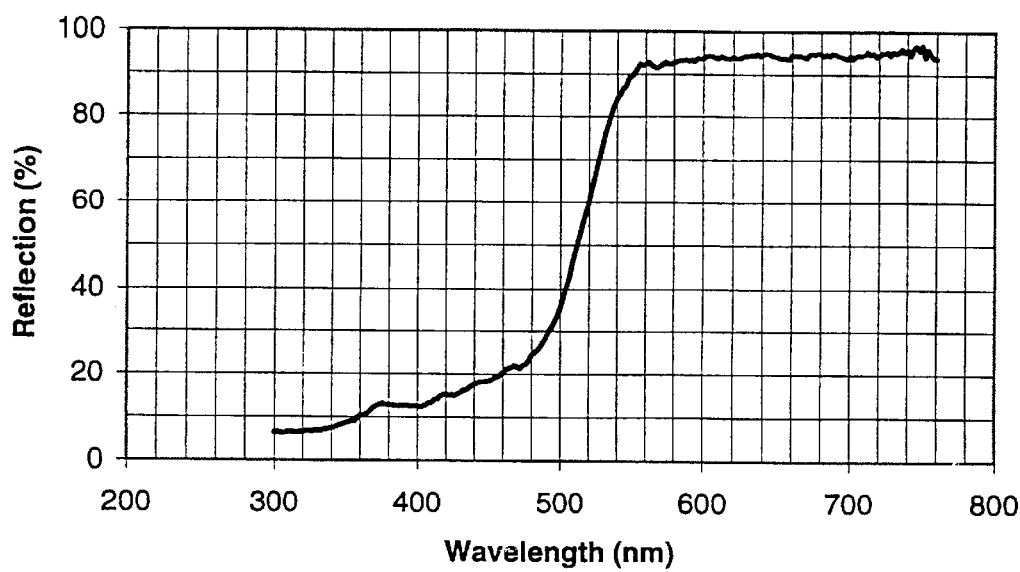
FIG. 2 shows the reflection spectrum of the phosphor from FIG. 1.

To produce a phosphor having the composition $(Sr_{0/105}Ca_{0.210}Mg_{0.630}Eu_{0.055})S \cdot 1.1Ga_2S_3$, high-purity oxides and/or carbonates in the quantities which correspond to the formula are weighed in as starting materials and a homogenous, finely milled mixture of the oxides is produced. This mixture of raw materials is mixed in equimolar quantities with approximately 30% strength nitric acid, is heated until it is gently boiling and is reacted to form nitrates. The following reaction equation applies:

0.210 mol $CaCO_3$+0.105 mol $SrCO_3$+0.630 mol Mgo+ 0.0275 mol $Eu_2O_3$+1.100 mol $Ga_2O_3$+8.6 mol $HNO_3$ → 0.210 mol $Ca^{2+}$0.105 mol $Sr^{2+}$0.630 mol $Mg^{2+}$0.055 mol $Eu^{3+}$2.200 mol $Ga^{3+}$8.6 mol $NO_{3+}$4.3 mol $H_2O$+ 0.315 mol $Co_{2\uparrow}$ A white suspension of precipitated nitrates is formed. This suspension is evaporated until it reaches a highly viscous state. The nitrate suspension obtained is transferred into a quartz boat and is dried in a stream of nitrogen at 300° C.

The dried nitrate mixture is milled in a mortar mill for 20 minutes and is then pyrolyzed at 600° C. for four hours under nitrogen, in accordance with the following reaction equation:

0.210 mol $Ca(NO_3)_2$+0.105 mol $Sr(NO_3)_2$+0.630 mol $Mg(NO_3)_2$+0.055 mol $Eu(NO_3)_3$+2.200 mol $Ga(NO_3)_3$ → 1 mol [0.210 CaO·0.105 SrO·0.630 MgO·0.055 $Eu_2O_3$·1.100$Ga_2O_3$]+8.6mol $NO_2$ +2.15 mol $O_2$.

The oxide mixture which is produced is introduced into a quartz boat and is heated to 900° C. in a tubular furnace under inert gas (argon). After the reaction temperature has been reached, 120 ml/min of hydrogen sulfide, using 30% of $H_2S$ in the stream of nitrogen, is introduced and the oxide mixture is reacted over the course of four hours to form the thiogallate, in accordance with the following reaction equation:

1 mol [0.210 CaO·0.105 SrO·0.630 MgO·0.055 $Eu_2O_3$·1.100 $Ga_2O_3$]+4.3275 mol $H_2S$ →1 mol $[(Sr_{0.105}Ca_{0.21}Mg_{0.63}Eu_{0.0275})S \cdot 1.1Ga_2S_3]$+4.3275 mol $H_2O$+0.0275 mol S.

A temperature of 870 to 930° C. has proven to be the optimum reaction temperature for a high-efficiency phosphor.

The reaction product is milled for 10 minutes in a mortar mill and is then reacted for a further three hours in 20% strength flowing hydrogen sulfide at 900° C.

Compared to a phosphor of the formula $(sr_{0.0105}Ca_{0.0210}Mg_{0.630}Eu_{0.055})S \cdot 1.0Ga_2S_3$ (w=1), this phosphor has a quantum efficiency which is improved by 17%, while the emission spectrum remains unchanged, with an intensity maximum at 548 nm ±1 nm.

The process described above can be used to reproducibly produce high-efficiency phosphors of the abovementioned compositions.

Further exemplary embodiments led to the phosphor compositions described in Table 1. This table compiles the results of the determination of quantum efficiency for phosphors which have been produced analogously to the abovementioned exemplary embodiment, with the A-cation mixture $Sr_{0.105}Ca_{0.210}Mg_{0.630}Eu_{0.055}$ but in each case a different ratio w=$B_2S_3$/AS. The quantum efficiency increases considerably if w is selected to be either lower than 1 or higher than 1, with the emission wavelength remaining unchanged, with a maximum emission intensity of 548 nm to 549 nm. A considerably lower quantum efficiency of <10% was determined for w=1.25, indicating that the range of existence of the relevant phosphor formation has been exceeded. In particular, the emission wavelength with a significant band at 615 nm indicates that the incorporation of the activator $Eu^{2+}$in the lattice is no longer taking place in the desired way. This limit value in each case varies slightly as a function of the precise composition of the cation mixture A.

On account of the complex reaction mechanisms involved in the formation of the phosphor compositions given in the exemplary embodiments and the modification of the atomic crystal structure resulting from the changes in composition, it is assumed that a number of effects contribute to the observed dependency of the quantum efficiency on the cation ratio A:B. On the one hand, changing the A:B ratio may contribute to better conversion of the reaction product. As a result, disadvantageous secondary products and residual precursor and intermediate products are avoided. On the other hand, the incorporation of the activator $Eu^{2+}$can also be promoted with a view to more complete and less disruptive incorporation in the crystal lattice of the thiometallates. It may also be important to more successively achieve a sulfur stoichiometry which conforms to the correct balance and can be more successfully matched to the local atomic cation composition using a core-shell formation model. Overall, the changed phosphor composition leads to increased perfection of the phosphor product and/or to a reduction in the number of non-radiating recombination centers which reduce the QE.

FIG. 1 shows the emission spectrum of the phosphor $(Sr_{0.105}Ca_{0.210}Mg_{0.630}Eu_{0.055}S \cdot 1.1(Ga_2S_3)$, which is described in the above exemplary embodiment (w=1.1). For comparison purposes: when written conventionally, this phosphor approximately corresponds to the representation $(Mg_{0.06}Ca_{0.21}Sr_{0.0105}Eu_{0.055})_{0.9}Ga_2S_{3.9}$. The emission band lies in the green spectral region between approximately 500 nm and 620 nm. The emission maximum is at 548 nm, the mean wavelength at 557 nm. The color locus components are x=0.366; y=0.618. The quantum efficiency reaches 81% under narrow-band excitation at 400 nm. By comparison, the quantum efficiency of the stoichiometric phosphor, i.e. with w=1.0 instead of w=1.1, is less than 70%.

The phosphor according to the invention can be excited well by short-wave radiation between 300 and 500 nm. It is particularly advantageously suitable for use in LEDs for color conversion, as a so-called LED converter. In this case, the emission radiation from a UV-emitting LED is converted by means of one or more phosphors into visible light (in this case green or blue-green) or white light (mixture of red-emitting, green-emitting and blue-emitting phosphors). A second variant, when using a blue LED, is the use of one phosphor or of two phosphors (e.g. yellow-emitting or green-emitting and red-emitting phosphors), so that in this case too white light results. Technical details of this aspect can be found, for example, in U.S. Pat. No. 5,998,925.

The application of these phosphors as LED converters can be successfully achieved, for example, by solid casting by means of epoxy resins. For this purpose, the phosphor powder is dispersed in an epoxy resin, is placed onto the chip in the form of a drop and is cured. An important factor here is that the thiometallates have a nonpolar surface similar to that of the likewise nonpolar resin, which leads to good wetting. Further advantages reside in the fact that mixtures with other phosphors, such as YAG:Ce or YAG:Ce-based phosphors, are eminently successful, since the relative density of both classes of phosphor is similar, so that there is no segregation caused by sedimentation effects given a comparable particle size. The relative density of typical thiometallates is approx. 4.4 to 4.5 g/cm$^3$, while that of YAG:Ce-based phosphors is typically 4.6 to 4.7 g/cm$^3$. Sedimentation in the resin can be minimized by using mean particle sizes of <5 μm, in particular around 2 ±1 μm. The particle size is set by milling, e.g. in ball mills.

TABLE 1

Results of the determination of the quantum efficiency for phosphors having the A-cation mixture $Sr_{0.105}Ca_{0.21}Mg_{0.63}Eu_{0.055}$ and a varying ratio w (w = $B_2S_3$/AS).

| w | Sr Molar proportion | Ca Molar proportion | Mg Molar proportion | Eu Molar proportion | QE % | Emission wavelength nm |
|---|---|---|---|---|---|---|
| 0.9 | 0.105 | 0.21 | 0.63 | 0.055 | 72 | 549 |
| 1 | 0.105 | 0.21 | 0.63 | 0.055 | 64 | 548 |
| 1.1 | 0.105 | 0.21 | 0.63 | 0.055 | 81 | 548 |
| 1.2 | 0.105 | 0.21 | 0.63 | 0.055 | 76 | 549 |
| 1.25 | 0.105 | 0.21 | 0.63 | 0.055 | <10 | 549–615 |

What is claimed is:

1. A process for producing a high-efficiency phosphor from the class of the thiometallates based on the formula $AB_2S_4:D^{2+}$, where A is at least one divalent cation selected from the group consisting of Mg, Ca, Sr, and where B is at least one trivalent cation selected from the group consisting of Al, Ga, Y, and where europium and/or cerium is selected as activator D which substitutes for A, wherein the composition of the phosphor is made up in such a way that it corresponds to the general formula $(AS)\cdot w(B_2S_3)$, where the factor w lies either in the range $0.8 \leq w \leq 0.98$ or in the range $1.02 \leq w \leq 1.2$, comprising the following process steps:

a) production of a suspension of nitrates corresponding to the desired composition;

b) drying of this suspension to a residual moisture content of <1% by weight at $T \leq 300°$ C., in order to produce a finely dispersed nitrate mixture;

c) milling of the nitrate mixture in a mortar mill at room temperature for 10 min to 60 min;

d) pyrolysis of the milled nitrate mix at 500–700° C., in an Ar or $N_2$ atmosphere in order to produce a finely dispersed metal oxide mixture of the desired composition;

e) initial reaction of the metal oxide mixture at 800–1000° C., in flowing $H_2S$ or $CS_2$ atmosphere or combinations thereof for 1–6 hours, preferably 4 hours;

f) milling the reaction product as in step c;

g) second reaction at 800–1000° C., in a flowing $H_2S$ or $CS_2$ atmosphere or combinations thereof for 1–6h.

2. The process as claimed in claim 1, wherein in steps e) and g) the quantitative flow rate is 50–500 ml/min and the gas atmosphere comprises $H_2S$ or $CS_2$ and Ar or $N_2$ as carrier gas, with 10–50% of $H_2S$ or $CS_2$ or mixtures thereof.

3. The process as claimed in claim 1, wherein in steps e) and g) the heating up to the reaction temperature takes place at 0.5–20 K/min.

4. The process as claimed in claim 1, wherein in steps e) and g) the cooling takes place at 0.5–20 K/min.

* * * * *